US012643594B2

(12) United States Patent
Uchyla et al.

(10) Patent No.: US 12,643,594 B2
(45) Date of Patent: Jun. 2, 2026

(54) STEERING COLUMN ASSEMBLY

(71) Applicant: ZF Steering Systems Poland Sp. Z.o.o., Czechowice-Dziedzice (PL)

(72) Inventors: Damian Uchyla, Strumień (PL); Pawel Ponikiewski, Pewel Mala (PL); Artur Wojtalik, Katowice (PL); Dawid Klimek, Żywiec (PL)

(73) Assignee: ZF Steering Systems Poland Sp. Z.o.o., Czechowice-Dziedzice (PL)

( * ) Notice: Subject to any disclaimer, the term of this patent is extended or adjusted under 35 U.S.C. 154(b) by 777 days.

(21) Appl. No.: 17/871,253

(22) Filed: Jul. 22, 2022

(65) Prior Publication Data

US 2023/0036513 A1     Feb. 2, 2023

(30) Foreign Application Priority Data

Jul. 29, 2021    (EP) ..................................... 21461574
May 13, 2022    (GB) ..................................... 2206998

(51) Int. Cl.
    B62D 1/19         (2006.01)
(52) U.S. Cl.
    CPC .................................. B62D 1/195 (2013.01)
(58) Field of Classification Search
    CPC ........ B62D 1/185; B62D 1/183; B62D 1/187; B62D 1/19; B62D 1/195; B62D 1/16
    See application file for complete search history.

(56) References Cited

U.S. PATENT DOCUMENTS 4,041,796 A  *  8/1977  Shishido ................ B62D 1/184
                                                      74/531
4,102,218 A  *  7/1978  Naka ...................... B62D 1/184
                                                      74/540
(Continued)

FOREIGN PATENT DOCUMENTS

DE           2558985 A1      7/1976
DE      112018004682 T5      6/2020
(Continued)

OTHER PUBLICATIONS

Kurusu, JP-H0134184-B2, Machine Translation of Specification (Year: 1989).*
(Continued)

*Primary Examiner* — Paul N Dickson
*Assistant Examiner* — Matthew Joseph Ganci
(74) *Attorney, Agent, or Firm* — Kristin L. Murphy

(57) ABSTRACT
A steering column assembly includes: a steering column shroud and a mounting bracket. The steering column shroud surrounds a steering shaft connected to a steering wheel that defines a plane disposed orthogonally to a longitudinal axis of a steering column. The mounting bracket is fixed in position relative to a vehicle part and comprises two depending bracket arms extending away from a main body. At least one bracket arm is configured to form a connection with a portion of the column shroud. The main body has at least one connection point arranged on opposing sides of the steering shaft for connecting the mounting bracket to the vehicle. At least one main body connection point on one side of the steering shaft is disposed an unequal distance from the plane defined by the steering wheel than any of the main body connection points on the steering shaft opposing side.

11 Claims, 4 Drawing Sheets

(56)         References Cited

U.S. PATENT DOCUMENTS 5,024,118 A * 6/1991 Khalifa .................. B62D 1/195
                                                                 188/376
2006/0000661 A1 * 1/2006 Daniel ................. B62D 5/0409
                                                                 180/444

FOREIGN PATENT DOCUMENTS

EP            0295378 A2 * 12/1988    ............. B62D 1/195
JP            H0134184 B2 *  7/1989
WO      WO-2013027520 A1 *  2/2013    .............. B62D 5/04

OTHER PUBLICATIONS

Wierschem, EP-0295378-A2, Machine Translation of Specification
(Year: 1988).*
Kikuta, WO-2013027520-A1, Machine Translation of Specification
(Year: 2013).*

* cited by examiner

STEERING COLUMN ASSEMBLY

CROSS-REFERENCE TO RELATED APPLICATION

This application claims priority to European Patent Application No. 21461574.2, filed Jul. 29, 2021 and GB Patent Application No. 2206998.3, filed May 13, 2022, the disclosure of which is incorporated herein by reference in its entirety.

TECHNICAL FIELD

This disclosure relates to improvements in steering column assemblies, and more particularly to a mounting bracket for use in a steering column assembly.

BACKGROUND

A requirement of a steering system for most modern vehicles is to control the movement of the steering wheel during a vehicle crash which forces the driver onto the steering wheel. In the case of a front impact where the driver is not restrained by a seatbelt, the driver can strike the wheel with a very high force. To prevent significant injury to the driver in the event of a crash the steering column should be able to collapse as an axial load is applied through the steering wheel.

It is known to provide a collapsible steering column assembly comprising a steering shaft that is supported within a steering column shroud. A typical collapsible steering column assembly comprises a telescopic shroud, having an outer shroud portion and an inner shroud portion, an end of the inner shroud portion extending into the outer shroud portion. The outer shroud portion may be located closer to the steering wheel, or further from the steering wheel than the inner shroud portion. A telescopic steering shaft, also having an upper and lower shaft part, is supported inside the shroud through one or more bearing assemblies. The steering wheel is fixed to the upper shaft portion.

The part of the shroud closest to the wheel must be able to move, or collapse, during a crash so as to allow the steering wheel to move forwards relative to the vehicle body but be prevented from moving during normal use. There is also a need to fix the shroud relative to the vehicle body to define the rake position of the steering wheel. This is typically achieved by a clamp mechanism that secures the shroud to a mounting bracket that is in turn fixed to the vehicle body, perhaps to a cross beam provided behind the dashboard of the vehicle. The clamp mechanism may be adjustable to permit reach adjustment, or rake adjustment, or both, of the steering wheel. In the event of a crash the shroud must be able to move, and this is achieved if it is able to break free of the clamp mechanism, or for the mounting bracket to be able to break free of the vehicle body, to allow the steering column assembly to collapse telescopically.

In assemblies where the mounting bracket is configured to be able to break free of the vehicle body, to allow the steering column assembly to collapse telescopically, the mounting bracket may typically be connected to the vehicle body by two or more breakaway capsules disposed on either side of the steering column. Due to tight packaging requirements, it is often difficult to fit the mounting bracket and breakaway capsules using known mounting brackets. During a crash, the mounting bracket may come into contact with other components such as the gearbox which may cause a sudden rise in load that can have a negative effect on the driver's safety. If the system packaging is tight, it is often difficult to avoid this contact.

It is therefore an aim of the present disclosure to overcome or at least mitigate the problems associated with the known prior art.

SUMMARY

According to a first aspect of the disclosure, there is provided a steering column assembly comprising:

a steering column shroud, which surrounds a steering shaft connected to a steering wheel. The steering wheel defines a plane disposed orthogonally to a longitudinal axis of the steering column. The steering column assembly further comprises a mounting bracket which is fixed in position relative to a part of a vehicle and comprises two depending bracket arms extending away from a main body. At least one bracket arm is configured to form a connection with a portion of the column shroud. The main body further has at least one connection point arranged on opposing sides of the steering shaft for connecting the mounting bracket to the vehicle. At least one main body connection point on one side of the steering shaft is disposed an unequal distance from the plane defined by the steering wheel than any of the main body connection points on the opposing side of the steering shaft.

The connection points may be configured such that the main body of the mounting bracket may be fixed to a portion of a vehicle body either directly or indirectly. The connection points may be configured to form a connection with one or more breakaway capsules where the breakaway capsules are configured to be affixed to a portion of the vehicle body.

Advantageously, the provision of at least one connection point on either side of the steering column shaft disposed an unequal distance from the plane defined by the steering wheel allows for an easier fit to the customer packaging requirements due to the mounting bracket not being limited only to symmetrical bracket shapes.

Advantageously, the provision of at least one connection point on either side of the steering column shaft being disposed an unequal distance from the plane defined by the steering wheel allows for longer distances to be provided from the mounting bracket and/or breakaway capsules to other components such as the gearbox, motor or ECU. In this way, the risk of contact between steering column assembly components and other vehicle components disposed near to the steering column assembly in the event of a crash is reduced.

Advantageously, the provision of at least one connection point on either side of the steering column shaft being disposed an unequal distance from the plane defined by the steering wheel allows for minimising the lengths of lever arms of the mounting bracket which in turn allows for stiffer mounting brackets. A stiffer mounting bracket is beneficial for the natural frequency of a steering column assembly.

A second plane may extend vertically from the steering column shaft. The second plane may extend through the main body such that a first side and a second side of the main body are disposed on opposing sides of the second plane.

The main body may comprise any suitable shape. The main body may comprise a substantially planar portion of material. The main body may comprise one or more portions of material arranged at relative angles to adjacent portions of material. The main body may comprise a front edge and a back edge where, in use, the front edge may be disposed closest to the front of the vehicle and the back edge may be disposed closest to the steering wheel.

The first side and second side of the main body may each comprise any suitable number of connection points. Each connection point may comprise a slot, aperture or the like that is configured to allow a connection between the main body of the mounting bracket and a corresponding breakaway capsule.

The first side and second side of the main body may each comprise a first connection point. The first connection point disposed on the first side of the main body may be disposed further forwards or further backwards than the first connection point disposed on the second side of the main body. In this way, the first connection point disposed on either the first side or the second side of the main body may be disposed closer to the plane defined by the steering wheel. Either of the first connection points may be disposed further from the steering column shaft than the opposing connection point.

The first side and second side of the main body may comprise a different number of connection points. For example, the first side may comprise one connection point and the second side may comprise two connection points. Each of the first or second sides may comprise two or more connection points. The first or second side of the main body may comprise at least two, three, four or at least five connection points, for example.

Advantageously, providing a main body where the first side and second side comprise a different number of connection points may allow for each side to form a connection with a breakaway capsule configured differently to the opposing breakaway capsule.

The first side of the main body may additionally comprise one or more different dimensions to the second side. The first side may extend further forward or further backward than the second side. Forwards may be defined as being in the direction of the front edge of the main body and backwards may be defined as in the direction of the back edge of the main body. The first side may extend a further lateral distance away from the steering column shaft than the second side.

The first side of the main body may extend over a greater surface area than the second side. The first side may comprise a different thickness to the second side. Advantageously, provision of a mounting bracket wherein each side of the main body comprises different dimensions may allow for less material to be used and therefore allow for a cheaper mounting bracket. In addition, the stiffness of each side may be configured to be different to the opposing side.

The steering column assembly may comprise a clamp mechanism configured to be movable between a clamped position in which the clamp mechanism fixes the shroud in position relative to the mounting bracket and a released position in which the clamp mechanism permits movement of the shroud relative to the mounting bracket.

The shroud that supports the steering shaft may comprise an upper shroud part and a lower shroud part, the upper shroud part moving telescopically relative to the lower part during reach adjustment of the steering column assembly.

The shroud may be telescopic and may comprise an inner member and an outer member, the inner member being at least partially received within the outer member.

One or more of the two depending bracket arms extending away from a main body portion may clamp on to an upper portion of the shroud or a lower portion, or to a fixing rail secured to an upper portion or to a lower portion. The clamp assembly may be arranged such that when the clamp is in the released position the rake of the steering column can be adjusted whilst the upper shroud portion and lower shroud portion remain fixed relative to one another.

Additionally, the clamp when in the released position may permit the upper shroud portion to move relative to the lower shroud portion to provide for reach adjustment, this movement being prevented when the clamp mechanism is moved to its clamped position. This arrangement therefore permits both rake and reach adjustment from the clamp mechanism.

During a vehicle crash, due to an asymmetrical clamping mechanism shape or asymmetrical clamping mechanism connection points, the application of force on the mounting bracket may be different on the left side to the right side. Advantageously, an asymmetrical mounting bracket may be designed to mitigate the asymmetrical forces applied in order to reduce bending forces. In this way, dangerous steering column bending and blocking may be avoided instead of smooth collapse of the steering column.

A person skilled in the art will understand that any relative features described in relation to either side of the mounting bracket may be applied vice versa.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF DRAWINGS

There will now be described, by way of example only, one exemplary arrangement of the present disclosure with reference to and as illustrated in the accompanying drawings of which.

DETAILED DESCRIPTION

Figure 1:
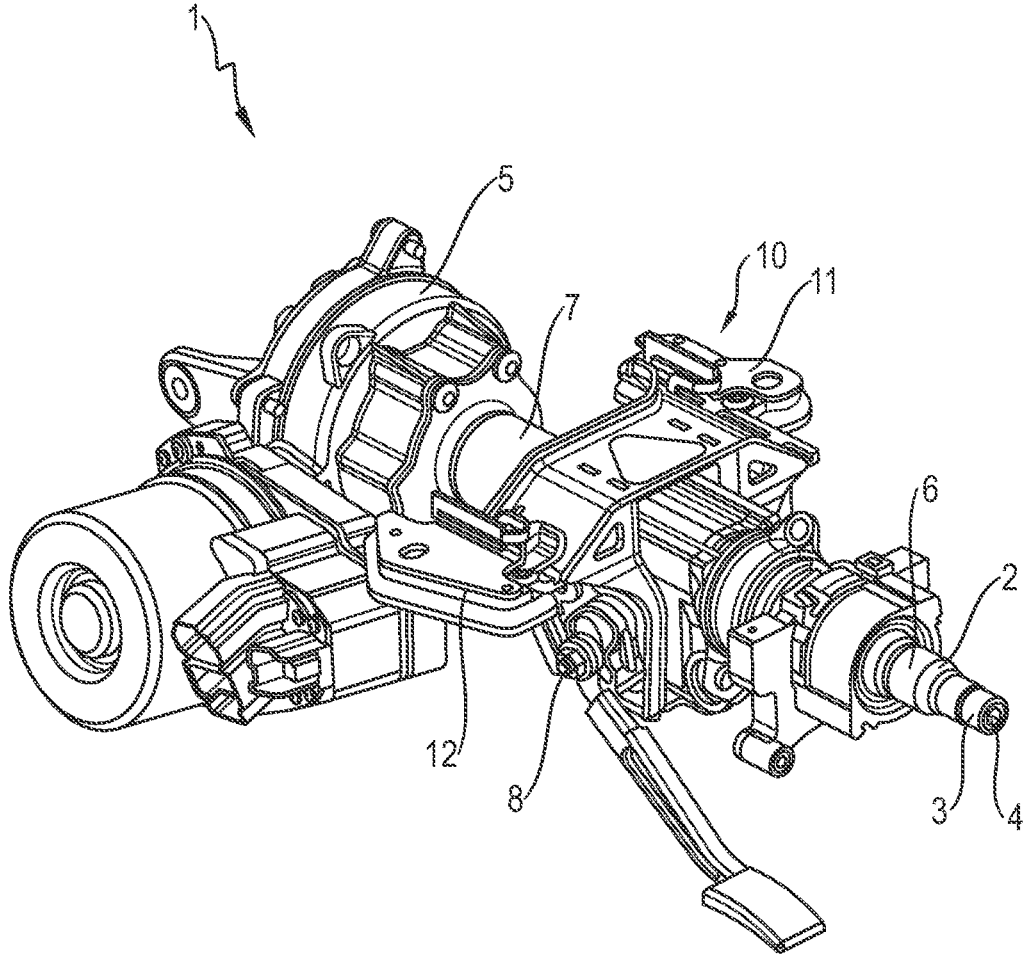
FIG. 1 is a view from the side of an embodiment of a steering assembly in accordance with the present disclosure.

As shown in FIG. 1 a steering column assembly 1 comprises a shroud 2 which supports a steering shaft 3. The end of the steering shaft 3, which can be seen protruding from the shroud 2, is provided with splines 4 that enable the shaft to engage a steering wheel of a vehicle. The steering wheel defines a plane that is substantially orthogonal to the longitudinal axis of the steering shaft 3. The other end, not shown, engages a gearbox located within a housing 5. The shroud 2 as shown has an upper portion 6 nearest the steering wheel and a lower portion 7 nearest the gearbox. The two shroud portions are tubular, and the end of the upper shroud portion furthest from the steering wheel is a sliding fit with an end portion of the lower shroud portion.

A clamp mechanism 8 can be moved between a released position in which the upper and lower shrouds are free to move axially and a clamped position in which they are prevented from moving during normal use.

To support the shroud 2 in a correct position for rake, the shroud 2 is fixed to a mounting bracket 10. This mounting bracket 10 is in turn secured to a fixed part of the vehicle, such as a cross beam, through a pair of breakaway capsules 11, 12.

Each breakaway capsule 11, 12 has a first part secured to the mounting bracket 10 and a second part secured to a fixed part of the vehicle. During normal use the breakaway capsules 11, 12 prevent the mounting bracket 10 moving relative to the fixed part of the vehicle.

The mounting bracket 10 comprises a main body 13 having a front edge 14 and a back edge 16. A first axis 18 extends between the front edge 14 and back edge 16 and through a central point of the main body 13. In the exemplary arrangement shown, the first axis 18 splits the main body 13 into a first side 20 and a second side 22. The first side 20 and second side 22 extend in substantially opposing directions from the axis 18. The main body comprises a second axis 19 disposed orthogonally to the first axis 18. The second axis is perpendicular to the plane defined by the steering wheel.

The first side 20 comprises different dimensions to the second side 22 and the first side 20 extends further forward than the second side 22. The first side 20 extends further forwards than the front edge 14 of the main body 13 whereas the second side 22 is disposed entirely behind the front edge 14. In some exemplary arrangements, the second side 20 may extend further forward than the first side 20.

The first side 20 comprises a first connection point 24 and the first connection point 24 comprises a slot. The first side 20 also comprises a second connection point 26 where the second connection point 24 comprises a circular aperture extending therethrough. Both the first and second connection points 24, 26 of the first side 20 are configured to allow a connection with the first breakaway capsule 11.

The second side 22 comprises a first connection point 30 where the first connection point 30 comprises a slot. The first connection point 30 of the second side 22 is configured to allow a connection with the second breakaway capsule 12.

The first connection point 24 of the first side 20 is disposed further from the plane defined by the steering wheel than the first connection point 30 of the second side 22. As can be seen most clearly from FIG. 4, the first connection point 24 of the first side 20 is disposed forwards from second axis 19 whereas the first connection point 30 of the second side 22 is disposed rearward from the second axis 19. In this way, the first connection points 24, 30 are disposed at asymmetrical locations. By disposing the connection points of the bracket arms 20, 22 in asymmetrical locations, the mounting bracket 10 may be affixed to the vehicle at more suitable locations. In this way, the mounting bracket may be better suited to the tight packaging requirements of vehicles in which the steering assembly is to be fitted.

The mounting bracket 10 comprises two depending bracket arms 32, 34 extending away from the main body to form a U shape. The two bracket arms 32, 34 are rigidly affixed to the main body 13. In exemplary arrangements, one or both of the bracket arms 32, 34 may be configured to form a connection with a portion of the steering column 3 or steering column shroud 2, in use.

Figure 2:
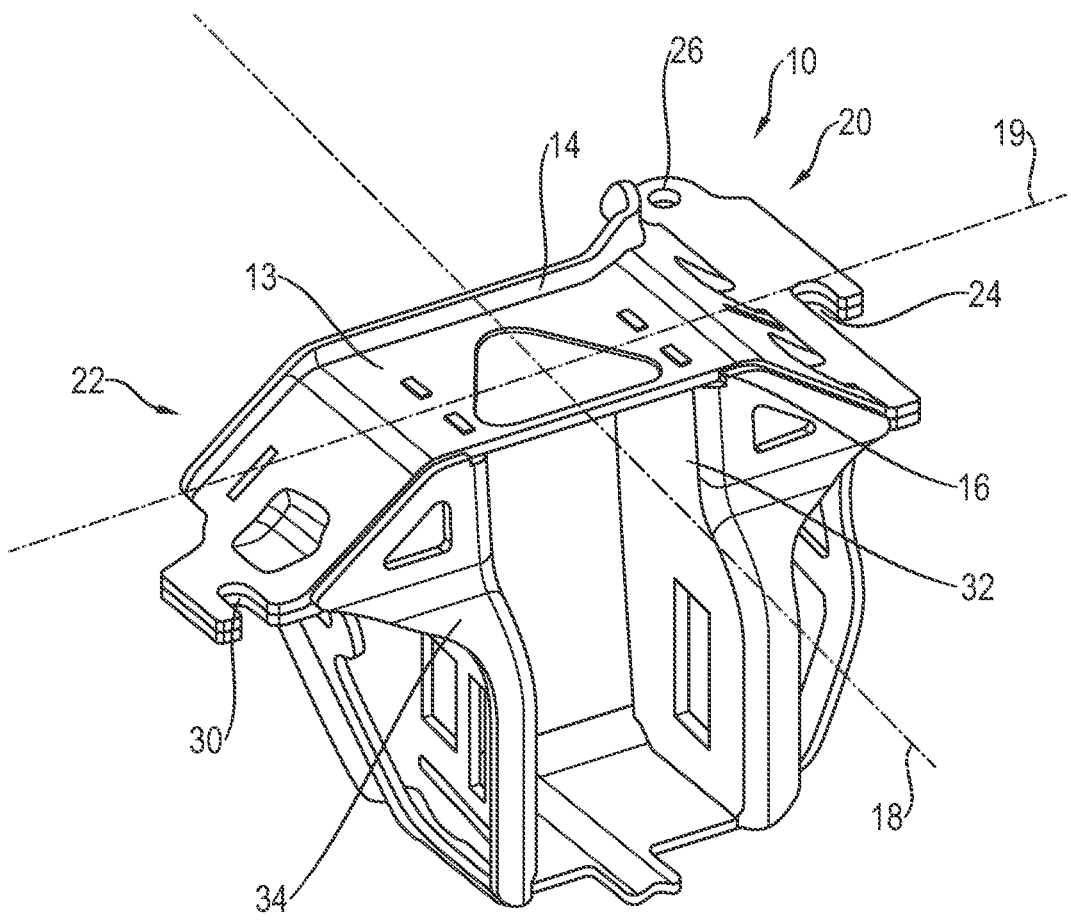
FIG. 2 is a perspective view of the mounting of the assembly of FIG. 1.
Figure 3:
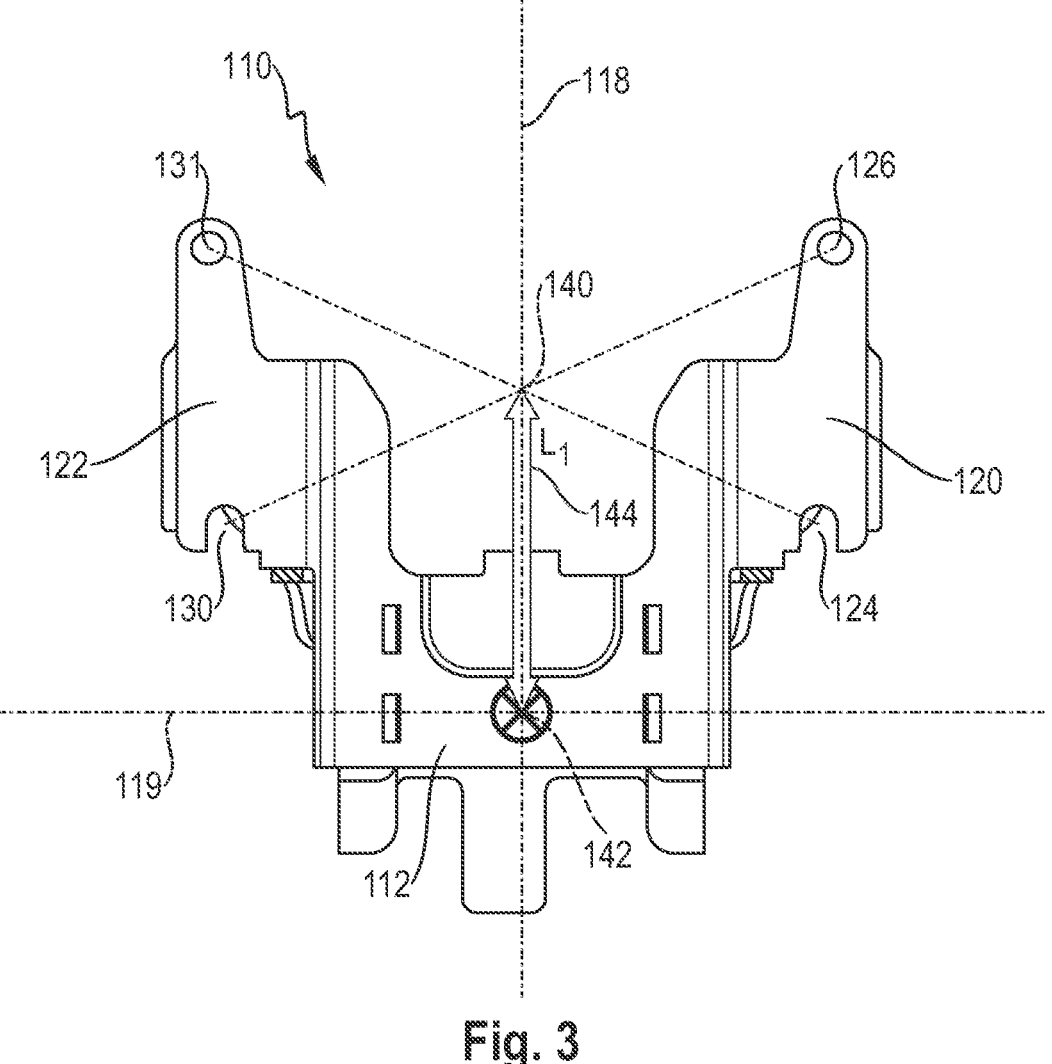
FIG. 3 is a view from above of a prior art mounting bracket.
Figure 4:
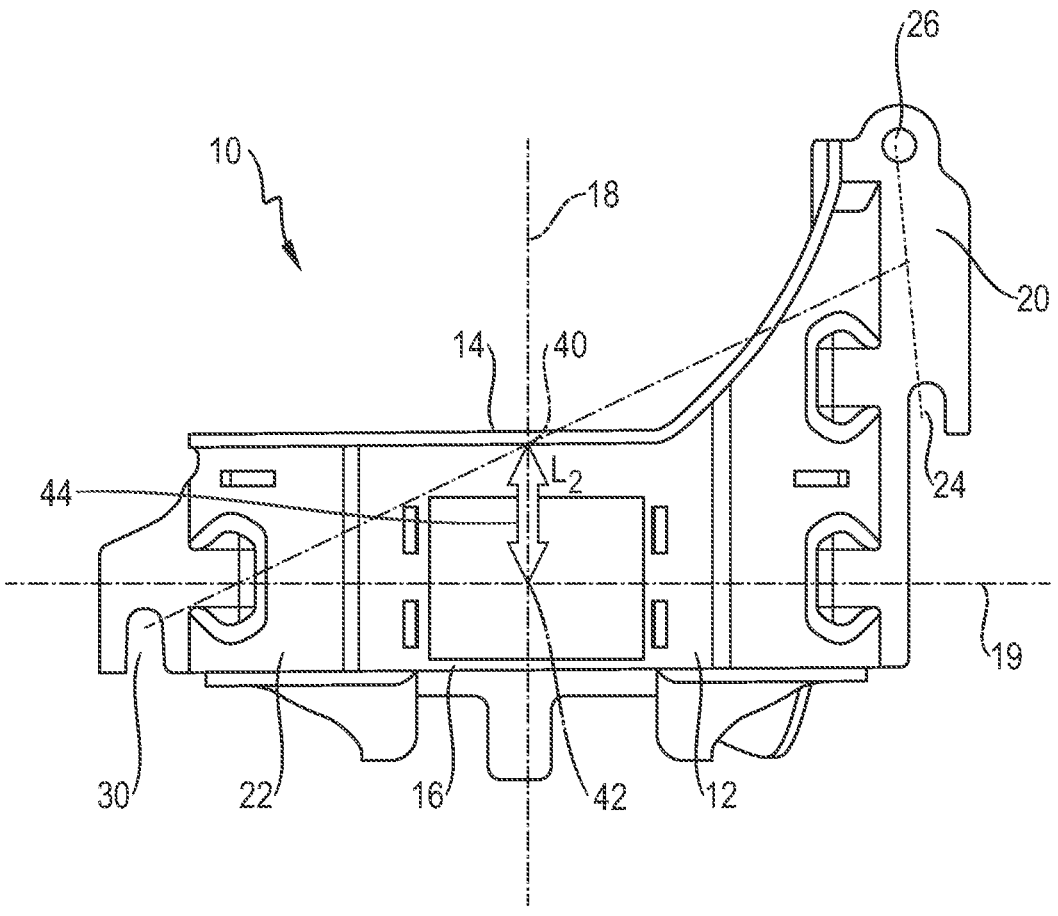
FIG. 4 is a view from above of the mounting of the assembly of FIG. 1.

FIG. 3 shows a view from above of a prior art mounting bracket 100 and FIG. 4 shows a view from above of the mounting bracket 1 of FIGS. 1 and 2.

As shown in FIG. 3, a known mounting bracket 110 comprises a main body 112. A first axis 118 extends through a center point of the main body 112 and a first side 120 is disposed on an opposing side of the first axis 118 to a second side 122. A second axis 119 is disposed orthogonally to the first axis 118.

The mounting bracket 110 comprises a pair of connection points 124, 126 disposed upon the first side 120 and a pair of connection points 130, 131 disposed upon the second side 122. Each pair of connection points is configured to allow the mounting bracket 100 to be affixed to a vehicle. A breakaway capsule may be connected to each pair of connection points and the breakaway capsules may then be fixed to the vehicle.

The pair of connection points 124, 126 disposed upon the first side 120 are disposed an equal distance from the second axis 119 as the pair of connection points 130, 131 disposed upon the second side 122. In this way, in use, the pair of connection points 124, 126 disposed upon the first side 120 are disposed an equal distance from a plane defined by a steering wheel as the pair of connection points 130, 131 disposed upon the second side 122.

The connection points may be connected by nominal lines to indicate a capsules fixing center point 140. This center point 140 may define the center point of the breakaway capsule connection points 124, 126, 130, 131 provided by the mounting bracket 110.

A column mounting point 142 is indicated and may define the point through which the forces of the steering column act upon the mounting bracket 110, for example in the event of a crash. As can be seen in FIG. 3, the distance between the capsules fixing center point 140 and the column mounting point 142 is indicated by the distance L1 144. The distance L1 144 between the capsules fixing center point 140 and the column mounting point 142 indicates the length of the lever arm through which steering column forces may act on the mounting bracket 110 in the event of a crash. A longer lever arm provides an increased risk of warping or buckling under load due to an increase in torque generated from any force applied. Warping, buckling or bending under load increases the risk that the steering column will not collapse smoothly. This in turn may increase the force on a driver impacting the steering wheel.

As shown in FIG. 4, the mounting bracket 10 comprises a pair of connection points 24, 26 disposed upon the first side 20 and a single connection point 30 disposed upon the second side 22 of the main body 12. A first breakaway capsule is connected to the pair of connection points 24, 26 disposed upon the first side 20 and a second breakaway capsule is connected to the connection point 30 disposed upon the second side 22.

The connection points 24, 26, 30 may be connected by nominal lines to indicate a capsule's fixing center point 40. This point may define the center point of the breakaway capsule connection points provided by the mounting bracket 10.

A column mounting point 42 is indicated and may define the point through which the forces of the steering column act upon the mounting bracket 110, for example in the event of a crash. As can be seen in FIG. 4, the distance between the capsules fixing center point 40 and the column mounting point 42 is indicated by the distance L2 44. The distance L2 44 between the capsules fixing center point 40 and the column mounting point 42 indicates the length of the lever arm through which steering column forces may act on the mounting bracket 10 in the event of a crash.

Comparing FIG. 3 and FIG. 4 it can be seen that L2 44 is shorter than L1 144. As such, the forces acting on the mounting bracket 10 from the steering column in the event of a crash act through a shorter lever arm than when compared to a known prior art mounting bracket 110. A shorter lever arm means a lower torque for a given force applied to an end of the lever arm. In this way, the mounting bracket 10 of the present disclosure reduces the risk of being or buckling and increases the chances that the steering column will collapse smoothly, providing the greatest safety to the driver.

As can also be seen when comparing FIGS. 3 and 4, the asymmetrical main body 12 of the mounting bracket 10 of the present disclosure allows for the second side 22 to be disposed further back than the first side 20. In this way, the first side 20 may be disposed further from other components in normal use such that in the event of a crash and steering column collapse, the mounting bracket 10 must travel further before contacting other components. This reduces the chances of a collision between the support 10 bracket and other components, therefore reducing the chances of increased impact loads on other components. In other exemplary arrangements, the asymmetry between the first side 20 and the second side 22 may be adjusted in relation to the packaging requirements of the vehicle to which the mounting bracket 10 is to be installed.

It will be understood that the disclosure is not limited to the exemplary arrangements described above. Various modifications and improvements can be made without departing from the concepts disclosed herein. Except where mutually exclusive, any of the features may be employed separately or in combination with any other features and the disclosure extends to all combinations and sub-combinations of one or more features disclosed herein.

The invention claimed is:

1. A steering column assembly comprising:
a steering column shroud, which surrounds a steering shaft connected to a steering wheel, the steering wheel defining a plane disposed orthogonally to a longitudinal axis of the steering column;
a mounting bracket which is fixed in position relative to a part of a vehicle and comprises two depending bracket arms extending away from a main body, at least one bracket arm being configured to form a connection with a portion of the column shroud, the main body further having at least one connection point arranged on opposing sides of the steering shaft for connecting the mounting bracket to the vehicle;
wherein the main body has at least one connection point on a first side of the steering shaft disposed both at a different longitudinal and lateral distance from the steering shaft than any connection point on a second side of the steering shaft, such that asymmetry is defined by both a longitudinal offset and a lateral offset relative to a reference plane orthogonal to the steering shaft, and
wherein the asymmetry is configured to direct bracket collapse laterally away from a driver's seating position and to prevent contact with adjacent vehicle components during impact.

2. A steering column assembly according to claim 1 wherein the connection points are configured to engage with one or more breakaway capsules, each breakaway capsule comprising a frangible interface designed to shear under a threshold load, and wherein the breakaway capsules are affixed to a reinforced portion of the vehicle body.

3. A steering column assembly according to claim 1 wherein a second plane extends vertically from the steering column shaft such that the first side and the second side of the main body are disposed on opposing sides of the second plane.

4. A steering column assembly according to claim 3 wherein the first connection point disposed on the first side of the main body is disposed further forwards or further backwards than the first connection point disposed on the second side of the main body.

5. A steering column assembly according to claim 4 wherein the first side and second side of the main body comprise a different number of connection points.

6. A steering column assembly according to claim 3 wherein the first side extends further forward or further backward than the second side.

7. A steering column assembly according to claim 2 wherein a second plane extends vertically from the steering column shaft such that the first side and the second side of the main body are disposed on opposing sides of the second plane.

8. A steering column assembly according to claim 7 wherein the first side and second side of the main body each comprise a first connection point.

9. A steering column assembly according to claim 8 wherein the first connection point disposed on the first side of the main body is disposed further forwards or further backwards than the first connection point disposed on the second side of the main body.

10. A steering column assembly according to claim 9 wherein the first side and second side of the main body comprise a different number of connection points.

11. A steering column assembly according to claim 10 wherein the first side extends further forward or further backward than the second side.

* * * * *